United States Patent
Paulsohn et al.

(10) Patent No.: US 7,828,635 B2
(45) Date of Patent: Nov. 9, 2010

(54) TOOL, DEVICE, AND METHOD FOR GUTTING FISH OPENED AT THE STOMACH CAVITY

(75) Inventors: Carsten Paulsohn, Lübeck (DE); Andreas Dann, Lübeck (DE); Roland Rüsch, Lübeck (DE); Manfred Brandt, Lübeck (DE)

(73) Assignee: Nordischer Mashinenbau Rud. Baader GmbH & Co. KG, Lubeck (DE)

( * ) Notice: Subject to any disclaimer, the term of this patent is extended or adjusted under 35 U.S.C. 154(b) by 28 days.

(21) Appl. No.: 12/298,231

(22) PCT Filed: Apr. 11, 2007

(86) PCT No.: PCT/EP2007/003355

§ 371 (c)(1),
(2), (4) Date: Oct. 23, 2008

(87) PCT Pub. No.: WO2007/128386

PCT Pub. Date: Nov. 15, 2007

(65) Prior Publication Data

US 2009/0233534 A1    Sep. 17, 2009

(30) Foreign Application Priority Data

May 6, 2006    (DE) .................. 10 2006 021 526

(51) Int. Cl.
A22C 25/14    (2006.01)
(52) U.S. Cl. ..................................... 452/116
(58) Field of Classification Search ............... 452/116, 452/106, 110, 119, 121, 122
See application file for complete search history.

(56) References Cited

U.S. PATENT DOCUMENTS

| 5,026,318 | A | * | 6/1991 | Jahnke ................. 452/116 |
| 5,098,334 | A | * | 3/1992 | Molaug ................. 452/116 |
| 5,830,052 | A | * | 11/1998 | Wadsworth ............. 452/161 |
| 5,980,376 | A | * | 11/1999 | Grosseholz et al. ....... 452/116 |
| 7,179,163 | B1 | * | 2/2007 | Vedsted et al. .......... 452/121 |
| 7,427,229 | B2 | * | 9/2008 | Grosseholz et al. ....... 452/106 |
| 7,559,830 | B2 | * | 7/2009 | Solberg et al. .......... 452/121 |
| 2004/0203331 | A1 | | 10/2004 | Grobeholz et al. |

FOREIGN PATENT DOCUMENTS

| DE | 19829376 | 2/1999 |
| DE | 10137647 | 2/2003 |
| DE | 69824008 | 9/2005 |
| EP | 0398017 | 11/1990 |
| WO | 2005/067724 | 7/2005 |

* cited by examiner

Primary Examiner—Thomas Price
(74) Attorney, Agent, or Firm—Mattingly & Malur, P.C.

(57) ABSTRACT

The invention concerns a tool for gutting fish (12) which have been opened at the stomach cavity (11), the tool (13) being designed as a suction element (23) for extraction of the entrails by suction, which is distinguished in that the suction element (23) is allocated an element (35) for clamping and/or squeezing the entrails to be removed. Furthermore the invention concerns an apparatus for gutting fish (12) which have been opened at the stomach cavity (11), including a tool (13) for extraction of the entrails by suction, a measuring instrument (14) which is configured so as to detect specific fish data, and at least one control unit for controlling the tool (13) depending on the specific fish data detected by the measuring instrument (14), which is distinguished in that the tool (13) is designed as mentioned above. The invention further concerns a corresponding method for gutting fish (12).

2 Claims, 4 Drawing Sheets

Figure 1:
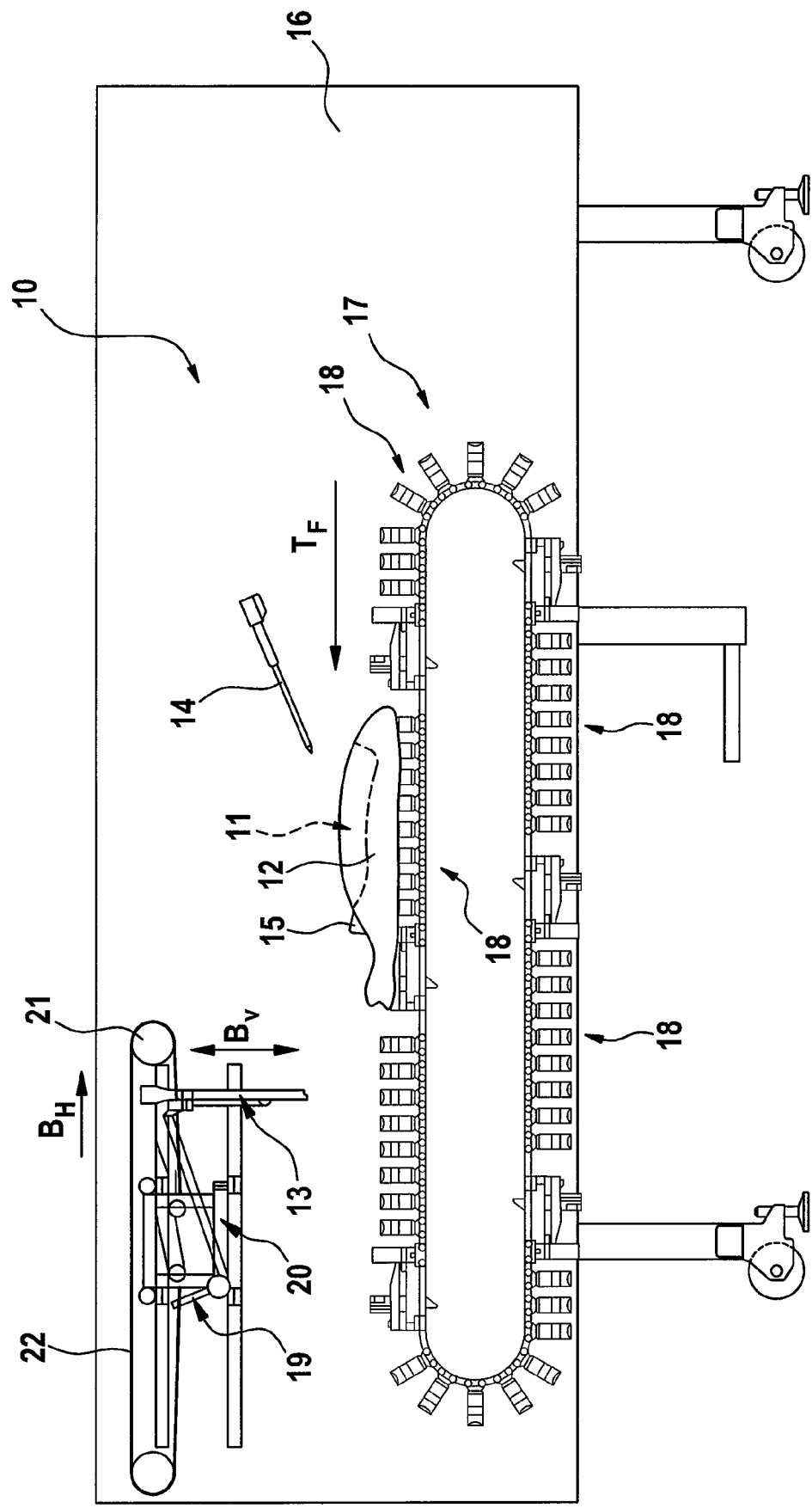

Fig. 2
Fig. 3
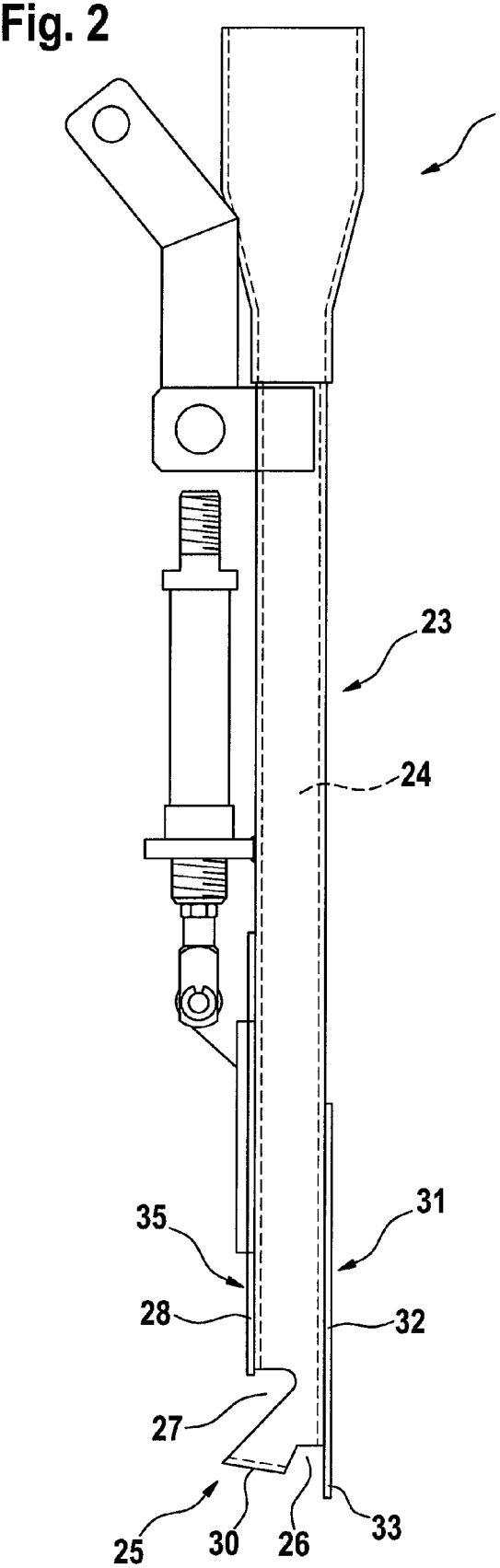
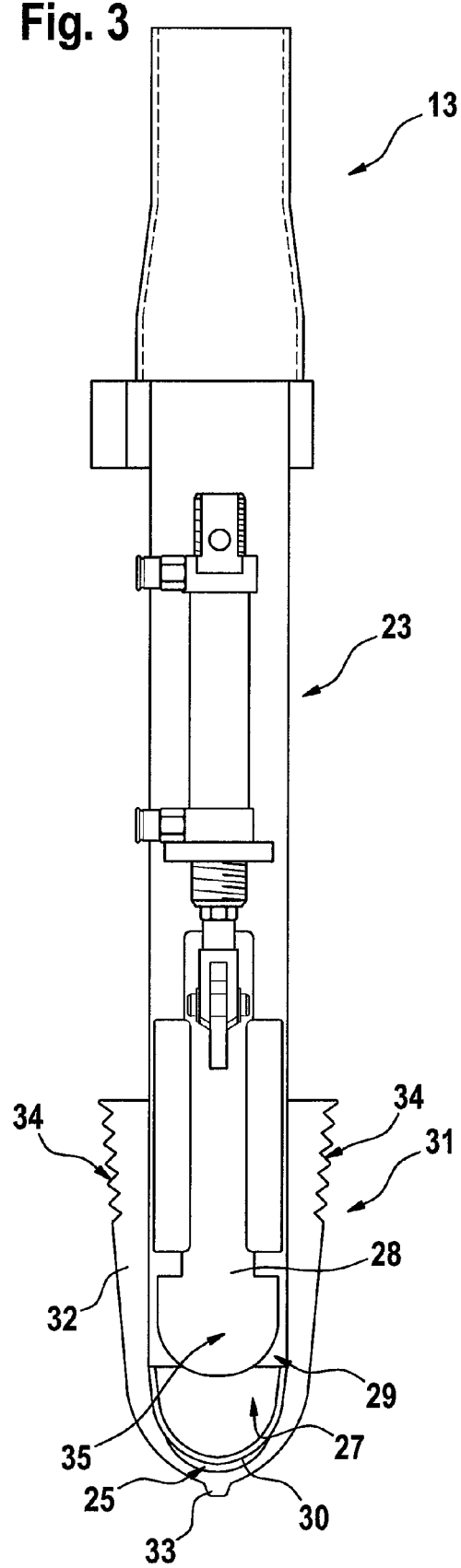

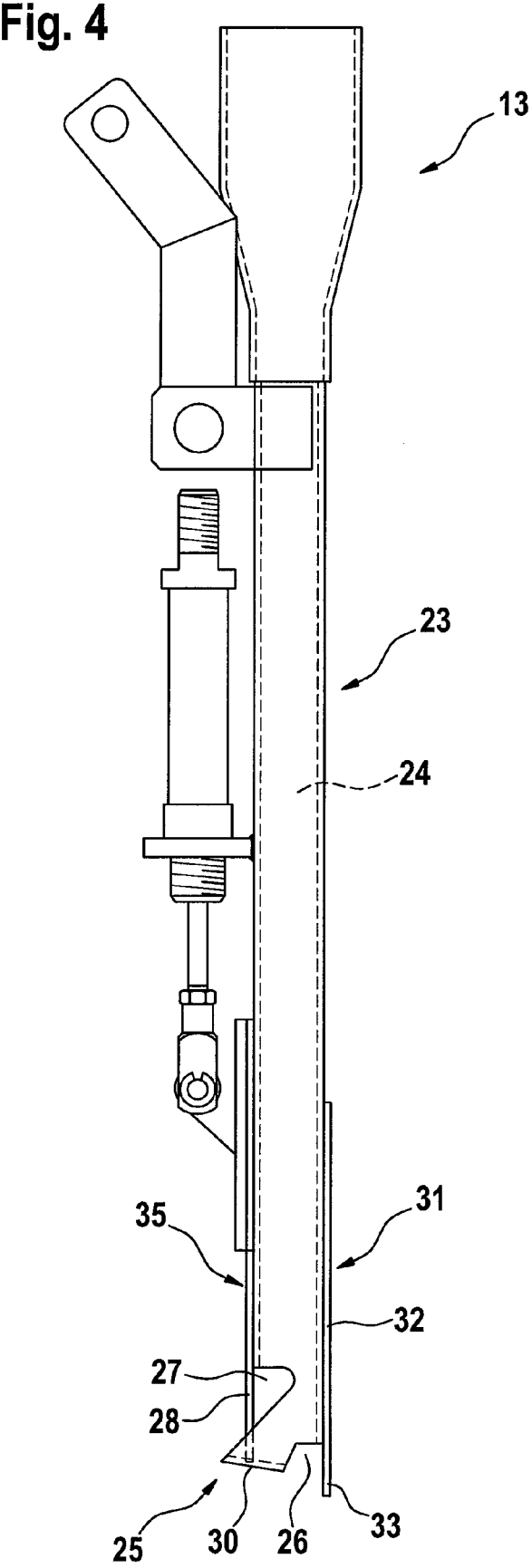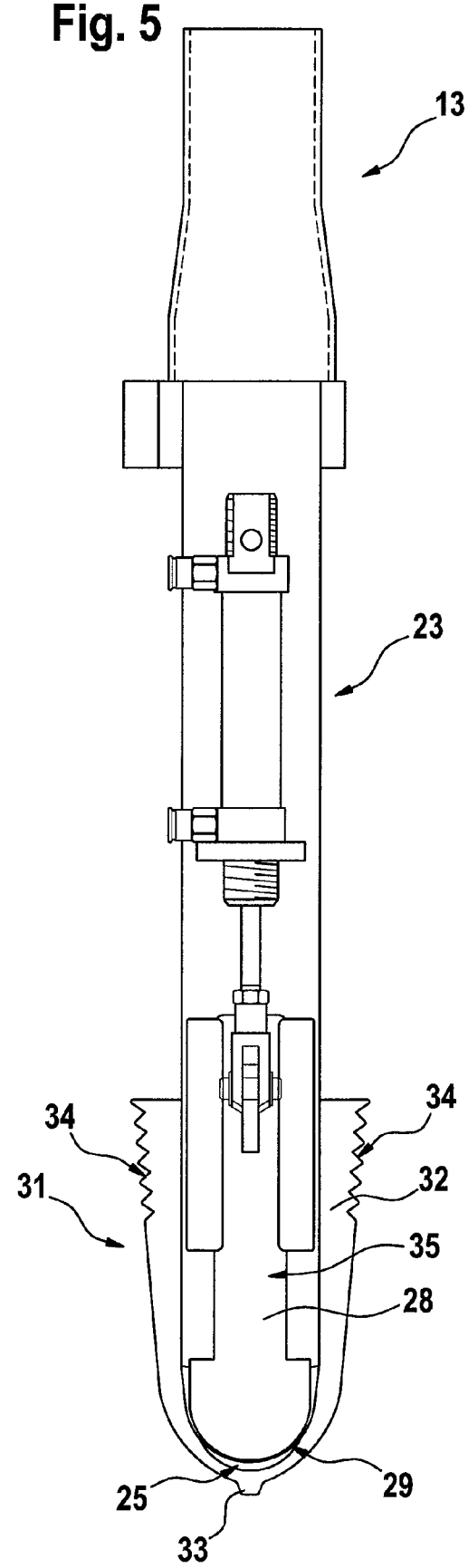

TOOL, DEVICE, AND METHOD FOR GUTTING FISH OPENED AT THE STOMACH CAVITY

DESCRIPTION

The invention concerns a tool for gutting fish which have been opened at the stomach cavity, the tool being designed as a suction element for extraction of the entrails by suction. Furthermore, the invention concerns an apparatus for gutting fish which have been opened at the stomach cavity, including a tool for extraction of the entrails by suction, a measuring instrument which is configured so as to detect specific fish data, and at least one control unit for controlling the tool depending on the specific fish data detected by the measuring instrument. Furthermore, the invention includes a method for gutting fish which have been opened at the stomach cavity.

When slaughtering fish, particularly of the salmon species, automated apparatuses as known for example from DE 698 24 008 T2 are usually used in practice. Here the stomach cavity of the fish is opened centrally with a blade or the like, and the entrails, the kidney, skins and other innards are removed by suction by means of a processing station which has at least one suction element. Gutting the fish can also be referred to as cleaning the fish. In gutting or cleaning, however, various remains of entrails, that is, intestinal remains, remains of the kidney, remains of innards and accumulations of blood in the stomach cavity remain, which must be eliminated or removed in a subsequent step. In particular, the intestine which is attached to the anus remains in the stomach cavity when gutting/cleaning. Entrails mean, amongst other things, all innards of the fish, that is, the kidney, blood remains, skins, intestines, etc.

In practice, after gutting the fish are guided onto a monitoring belt where the fish are monitored by operators and as a rule subsequent cleaned manually. The subsequent cleaning is also a gutting operation. For this, the operators usually use manual suction devices, flushing elements or the like. This procedure is, however, labour-intensive and therefore expensive. Furthermore, the process of gutting which is actually automated is interrupted. Also known are apparatuses for gutting or cleaning or subsequent cleaning, which allow automated subsequent cleaning of the gutted fish. These apparatuses have several suction elements which are lowered into the stomach cavity and which extract by suction remains left in the stomach cavity. However, it has been shown that, in spite of subsequent cleaning by suction, remains are still left in the stomach cavity. This concerns in particular the intestine which is located in the region of the anus and attached thereto and which must then in turn be removed manually.

It is therefore the object of the present invention to provide a tool which allows reliable removal of the entrails including the intestine. Furthermore, it is the object of the invention to propose an apparatus for removing the entrails as well as a corresponding method.

The object is achieved by a tool of the kind mentioned hereinbefore by the fact that the suction element is allocated an element for clamping and/or squeezing the entrails to be removed, the suction element having at the end an opening and radially at least one laterally directed opening. As a result it can be ensured that entrails joined to the stomach cavity and/or the anus or elsewhere to the fish are reliably removed as well. Clamping/squeezing has the particular advantage that in particular the intestine can be released and removed directly at the anus.

Preferably, the tool is designed as a combination tool, such that the clamping mechanism for clamping and/or squeezing the entrails is an integral part of the suction element. This ensures a particularly compact and reliable construction, the design as a single tool for clamping/squeezing on the one hand and extraction by suction on the other hand allowing reliable removal of the entrails.

In a preferred development of the invention, the element for clamping and/or squeezing the entrails is composed of a sliding element which is movable out of an upper standby position into a lower clamping position and vice versa. As a result, entrails can be clamped, released and then extracted by suction particularly neatly, in particular in edge regions of the stomach cavity, e.g. in the region of the anus as well.

An appropriate embodiment provides that the suction element is allocated a scraping element. With the scraping element the stomach cavity can be effectively cleaned.

Advantageously, the scraping element has a projection on its lower side facing towards the backbone of the fish. This projection is suitable for engaging in the so-called intrabony pockets, so that in particular the intrabony pockets in the rear region of the stomach cavity, that is, in the region of the anus, are thoroughly cleaned.

Furthermore, the object is achieved by an apparatus of the kind mentioned hereinbefore by the fact that the tool is designed according to any one of claims. The resulting advantages have been described above, so that a repetition at this point is dispensed with.

Advantageously, the tool is movable in the direction of transport $T_F$ or in the direction opposite the direction of transport $T_F$ of the fish. This actively allows movement within the stomach cavity, so that given positions within the stomach cavity can be controlled. As a result the tool can be moved exactly to the positions at which entrails or remains of entrails, such as amongst others the intestine, must be released and removed.

The object is also achieved by a method mentioned hereinbefore, which is distinguished by the following steps: detection of specific fish data by means of a measuring instrument, immersion of a tool for extracting the entrails by suction in the opened stomach cavity, steering of the tool to a predefined position within the stomach cavity by means of a control unit which is functionally connected to the measuring instrument and the tool, clamping/squeezing of the entrails by the tool, production of a relative movement between the fish and the tool, and extraction by suction by the tool of the entrails released by the previous step. On the resulting advantages, reference is made to the previous sections.

Figure 6:
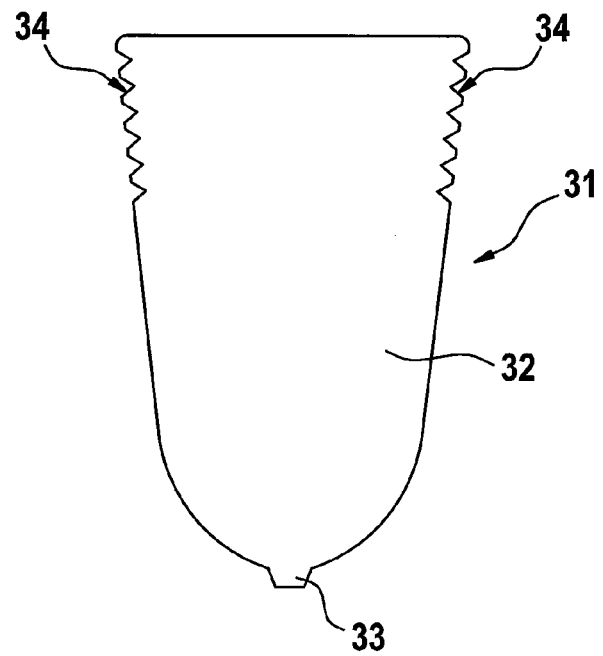
Figure 7:
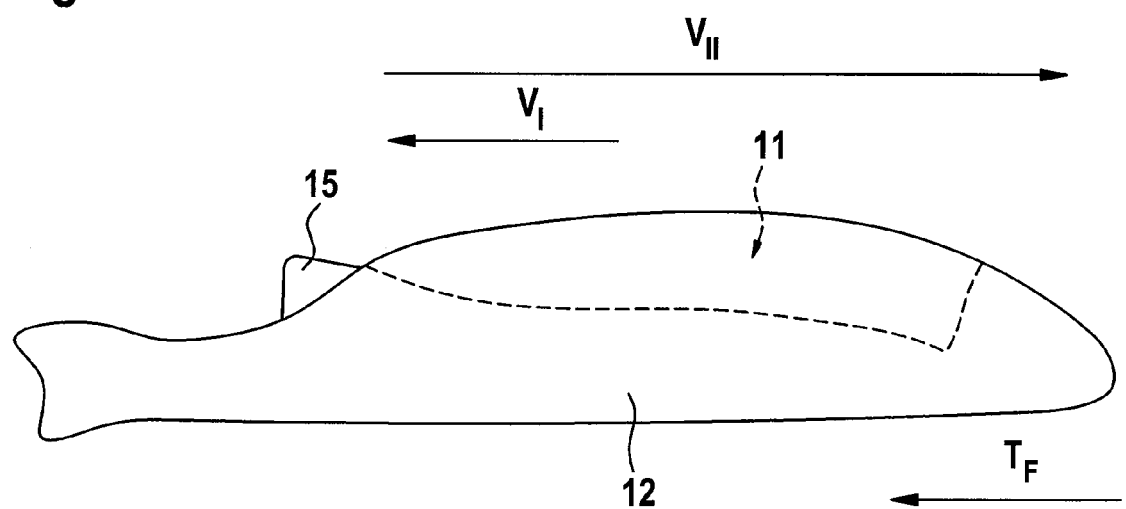

Further features and preferred and/or appropriate embodiments and developments are apparent from the subsidiary claims and the description. A particularly preferred embodiment is described in more detail with the aid of the attached drawings. The drawings show:

FIG. 1 a schematic view of an apparatus according to the invention for gutting fish which have been opened at the ventral cavity with a tool according to the invention, FIG. 2 a side view of the tool for gutting in an opened position, that is, with the element for clamping/squeezing in the standby position, FIG. 3 a front view of the tool according to FIG. 2, FIG. 4 a side view of the tool for gutting in a closed position, that is, with the element for clamping/squeezing in the clamping position, FIG. 5 a front view of the tool according to FIG. 4, FIG. 6 a front view of a scraping element as part of the tool according to FIGS. 2 to 5, and FIG. 7 a schematic view of an example of the directions of movement of the tool within the stomach cavity.

The tools and apparatus shown serve to subsequently clean fish which have already been gutted or cleaned beforehand. Naturally the tools and apparatuses can also be used to gut or clean the fish themselves.

In FIG. 1 is shown an apparatus 10 for gutting fish 12 which have been opened at the stomach cavity 11, which can be used as an individual module or as part of a slaughter machine or a whole slaughter line. The apparatus 10 itself comprises at least one tool 13 for removing, in particular sucking out, the entrails from the stomach cavity 11, a measuring instrument 14 and at least one control unit (not shown). The measuring instrument 14 is designed or configured in such a way that specific fish data can be detected. This concerns in particular the length and height of the fish 12, the position of the anal fin 15 and the connected anus itself. In addition to the above geometrical data, further data including image data can be detected. In the embodiment shown, the measuring instrument 14 is a tongs-like feeler with which in particular the exact position of the anal fin 15 and hence the anus can be detected. Other mechanical and/or contactless measuring means, in particular also optical elements such as e.g. cameras, etc., are possible too. The control unit connects the measuring instrument 14 to the tool 13. To be more precise, the tool 13 can be controlled by means of the control unit on the basis of the detected data by the measuring instrument 14.

The apparatus 10, which is usually located in a housing 16 or arranged on a frame, is allocated a conveyor 17 which may however be part of the apparatus 10. The conveyor 17 has at least one, but preferably several receptacles 18 for accommodating the fish 12. The conveyor 17 is arranged in such a way that the fish 12 are conveyed along in the direction of transport $T_F$ beneath the measuring instrument 14 and the tool 13. In the process the fish 12 in the example shown are conveyed tail first lying on their backs. Other directions of conveying or fish orientations are possible too.

The apparatus 10 further includes means 19 for moving the tool 13 up and down. The means 19 can be designed in the usual manner, for example as a pneumatic cylinder or the like which is allocated to the tool 13. With the means 19, the tool 13 can be lowered substantially vertically downwards into the stomach cavity 11, that is, into the working position, and moved upwards, that is, into a standby position. The direction of movement is marked $B_V$ in FIG. 1. The tool 13 is additionally movable in a substantially horizontal direction (see arrow $B_H$), that is, in the direction of transport $T_F$ or in the direction opposite the direction of transport $T_F$. For this purpose the tool 13 in the embodiment described is arranged on a carriage 20 or the like which can be driven with a stepping motor 21 or the like via a toothed belt 22 or the like. But the capacity of the carriage 20 or tool 13 for movement can be accomplished in some other ordinary manner.

The central component of the apparatus 10 is the tool 13, which can also be retro-fitted as a component part on existing slaughter and/or cleaning apparatuses. The tool is designed as a suction element 23 for extracting the entrails by suction. The tool 13 described below, however, has several functions compared with traditional suction elements. The suction element 23 designed as a suction scraper has a suction channel 24 which is connected to a vacuum system, not shown. At its free end 25 the suction element 23 has a first opening 26 which exits from the suction channel 24 at the end. This opening 26 serves in particular to extract by suction the kidney or the contents thereof.

The suction element 23 further has a second opening 27 which is likewise located in the region of the free end 25. However, the second opening 27 is directed radially, seen from the suction channel 24. The laterally directed opening 27 is directed towards three sides and serves in particular to extract the entrails by suction, especially the intestine. The opening 27 if necessary can be at least partially closed or covered. To be more precise, the laterally directed opening 27 is closable on the side facing towards the entrails. This can be accomplished by valves, slides or otherwise. The preferred way of closing part of the opening 27 is described below. In the event that the opening 27 is closed partially, namely on one side, there remain however two opposed sides which are open so that the opening 27 then forms a kind of through-opening which runs transversely to the suction channel 24 and through the latter.

The suction element 23 is further allocated an element 35 with which an action can be performed directly on the entrails. To put it another way, the tool is a combination tool. The element 35 serves to clamp and/or squeeze the entrails to be removed. For this purpose various embodiments of the element 35 are suitable, for example counter-rotating rollers, clamps and other single-piece or multi-piece components. The clamping mechanism which is described in more detail below is preferably an integral part of the suction element 23, so that several functions can be performed with a single tool 13.

The element 35, that is, the clamping mechanism, is composed of a sliding element 28 which is movable from an upper standby position (see FIGS. 2 and 3) into a lower clamping position (see FIGS. 4 and 5) and vice versa. To be more precise, the sliding element 28 is movable up and down in the longitudinal direction of the suction element 23. In the lower clamping position the sliding element 28 is functionally connected to the suction element 23. For this purpose the sliding element 28 is adapted in shape to the opening 27. To put it another way, the sliding element 28 has a shovel-like free end 29 which is adapted to the shape of the opening 27, that is, is slidable in form-locking relationship in front of the opening 27, so that entrails, intestines or the like that are collected and picked up can be clamped between the sliding element 28 and a lower wall 30 of the suction element 23.

The suction element 23 is further optionally allocated a scraping element 31. The scraping element 31 is releasably attached to the suction element 23 on the side opposite the sliding element 28. The scraping element 31 is designed as a scraping plate 32 and displaceable in the longitudinal direction of the suction element 23. As a result, the amount of the scraping plate 32 projecting beyond the free end 25 of the suction element 23 can be varied. At the lower end of the scraping plate 32, that is, on the side facing towards the backbone of the fish 12, the scraping plate 32 has a projection 33 with which it is possible to engage in intrabony pockets of the fish 12 In addition, the scraping plate 32 can have laterally on both sides a structure 34 by means of which an additional cleaning effect can be obtained. By way of example, fluting of the side edges is shown.

As already mentioned above, the suction element 23 is to be connected to a vacuum system. Furthermore, the tool 13 can be connected to a control unit in order to make a functional connection between the tool 13 and an upstream measuring means.

Gutting or especially further cleaning of the fish 12 is described in more detail below with the aid of the figures. The position of the anal fin 15 and hence the anus is exactly determined by the measuring instrument 14. On the basis of the data determined, the tool 13 is moved by the control unit in the direction of transport $T_F$ of the fish 12 in front of the anal fin 15 into the stomach cavity 11, this being preferably to such a depth that the free end 25 of the tool 13 or suction element 23 lands on the backbone of the fish 12. The suction element 23 is then, while the fish 12 is continuously transported in the direction of transport $T_F$ through the apparatus 10, moved to the anus, this being in the direction of travel $V_I$ which corresponds to the direction of transport $T_F$. At the same time, optionally a pressure of the suction element 23 on the backbone can be maintained in a vertical direction in order in particular to clean the kidney under the effect of pressure. The speed at which the tool 13 or suction element 23 is moved is greater than the speed of transport of the fish 12.

While the suction element 23 is in the stomach cavity 11, entrails etc. are released and extracted by suction. This takes place in particular through the opening 26 of the suction element 23. Also in particular the intestine which is attached to the anus is sucked up by the suction element, this being through the opening 27 in the suction element 23. During the above working steps the element 35, that is, the sliding element 28 is in the upper standby position, so that the opening 27 is fully open. When the suction element 23 has reached the anus, the sliding element 28 is moved downwards into the clamping position, so that the intestine is clamped between the sliding element 28 and the suction element 23. By clamping, the opening 27 is closed on the side facing towards the anus or intestine, while the intestine is further sucked up through the remaining side openings of the opening 27. During movement in the direction of the tail, the intrabony pockets of the fish 12 are cleaned in particular by the scraping plate 32 with the projection 33.

Due to the fact that the fish 12 is further transported in the direction of transport $T_F$ and the suction element 23 on reaching the anus stops or is even moved in the opposite direction $V_{II}$ towards the head, the intestine tears directly at the anus, where the intestine has a kind of perforation due to a thin intestinal wall. During travel in the direction of the head, the kidney is further cleaned by scraping and suction as far as the end of the stomach cavity 11 in the region of the head. The result is a fully cleaned fish 12 which can be further processed without subsequent manual cleaning.

As described, the method serves in particular to subsequently clean fish 12 that have already been gutted by releasing and removing the intestine from the anus in addition to the remains left behind in the stomach cavity during the actual gutting process. Other gutting steps or cleaning steps are of course possible too in a corresponding form.

Below are described further embodiments which, in each case seen independently or together with other embodiments of the invention, can further develop the invention. Starting from the tool for gutting fish 12 which have been opened at the ventral cavity 11, the tool 13 being designed as a suction element 23 for extraction of the entrails, which is distinguished in that the suction element 23 is allocated an element 35 for clamping and/or squeezing the entrails to be removed, the suction element 23 having at the end an opening 26 and radially at least one laterally directed opening 27, the following characteristics are suitable for developing the invention either on their own or in combination with each other. In detail:

A further embodiment is characterised in that the laterally directed opening 27 is closable on the side facing towards the entrails.

A further embodiment is characterised in that the laterally directed opening 27 is designed as a through-opening in the state in which the side of the opening 27 facing towards the entrails is closed.

A further embodiment is characterised in that the sliding element 28 in the lower clamping position is operatively connected to the suction element 23.

A further embodiment is characterised in that the sliding element 28 in the clamping position abuts against the suction element 23 in form-locking relationship.

A further embodiment is characterised in that the scraping element 31 is located opposite the sliding element 28.

A further embodiment is characterised in that the scraping element 31 is designed as a scraping plate 32 and arranged releasably on the suction element 23.

A further embodiment is characterised in that the scraping element 31 is displaceable in the longitudinal direction of the suction element 23.

A further embodiment is characterised in that the amount of projection is variable.

A further embodiment is characterised in that the scraping element 31 has a projection 33 on its lower side facing towards the backbone of the fish 12.

A further embodiment is characterised in that the suction element 23 can be connected to a vacuum system or the like.

Starting from the apparatus for gutting fish 12 which have been opened at the ventral cavity 11, including a tool 13 for extraction of the entrails, a measuring instrument 14 which is configured so as to detect specific fish data, and at least one control unit for controlling the tool 13 as a function of the specific fish data detected by the measuring instrument 14. In detail:

A further embodiment is characterised in that the tool 13 is allocated a pneumatic cylinder or the like.

A further embodiment is characterised in that the tool 13 is arranged on a carriage 20 which is driven by means of stepping motors 21 or the like.

A further embodiment is characterised in that it comprises a conveyor 17 which has at least one receptacle 18 for accommodating the fish 12 to be processed.

A further embodiment is characterised in that the conveyor 17 is designed to receive fish 12 lying on their backs and for transport thereof tail first.

A further embodiment is characterised in that it forms part of a slaughter machine for fish.

Starting from the apparatus for gutting fish 12 which have been opened at the ventral cavity 11 and already at least partially gutted, which is distinguished by the following processing steps: detection of specific fish data by means of a measuring instrument 14, immersion of a tool 13 for extracting the entrails in the opened ventral cavity 11, steering of the tool 13 to a predefined position within the ventral cavity 11 by means of a control unit which is operatively connected to the measuring instrument 14 and the tool 13, clamping/squeezing of the entrails by the tool 13, production of a relative movement between the fish 12 and tool 13, and extraction by the tool 13 of the entrails released by the previous step, the following steps are suitable for developing the invention either on their own or in combination with each other. In detail:

A further embodiment is characterised in that the position of the anus is determined so that after immersion in the ventral cavity 11 the tool 13 is moved up to the anus.

A further embodiment is characterised in that the tool 13 is actively driven.

A further embodiment is characterised in that the tool 13 is pressed against the fish 12 or its backbone in a vertical direction during the horizontal movement towards and away from the anus.

The invention claimed is:

1. A tool for gutting fish which have been opened at the ventral cavity, the tool comprising:
   a suction element for extraction of the entrails, said suction element including an element for clamping and/or squeezing the entrails to be removed and having at one end an opening and radially at least one laterally directed opening, and,
   wherein the element for clamping and/or squeezing the entrails is composed of a sliding element which is movable out of an upper standby position into a lower clamping position and vice versa.

2. The tool according to claim 1, wherein the sliding element is movable up and down in the longitudinal direction of the suction element.

* * * * *